(12) United States Patent
Clifton

(10) Patent No.: US 11,087,001 B2
(45) Date of Patent: Aug. 10, 2021

(54) DETERMINING LOCATION OF SPECULATION DENIAL INSTRUCTIONS FOR MEMORY ACCESS VULNERABILITIES

(71) Applicant: Red Hat, Inc., Raleigh, NC (US)

(72) Inventor: Nick Clifton, Taunton (GB)

(73) Assignee: Red Hat, Inc., Raleigh, NC (US)

( * ) Notice: Subject to any disclaimer, the term of this patent is extended or adjusted under 35 U.S.C. 154(b) by 472 days.

(21) Appl. No.: 15/945,030

(22) Filed: Apr. 4, 2018

(65) Prior Publication Data

US 2019/0311129 A1    Oct. 10, 2019

(51) Int. Cl.
| | | |
|---|---|---|
| G06F 21/00 | (2013.01) | |
| G06F 21/57 | (2013.01) | |
| G06F 21/54 | (2013.01) | |
| G06F 21/53 | (2013.01) | |

(52) U.S. Cl.
CPC .......... G06F 21/577 (2013.01); G06F 21/53 (2013.01); G06F 21/54 (2013.01); *G06F 2221/034* (2013.01)

(58) Field of Classification Search
None
See application file for complete search history.

(56) References Cited

U.S. PATENT DOCUMENTS

| | | |
|---|---|---|
| 7,392,545 B1 | 6/2008 | Weber et al. |
| 8,090,934 B2 | 1/2012 | Koc |
| 9,128,728 B2 | 9/2015 | Siman |
| 2007/0219771 A1* | 9/2007 | Verheyen ............... G06F 30/33 703/15 |
| 2016/0371494 A1* | 12/2016 | Daymont ............. G06F 21/577 |
| 2017/0090977 A1* | 3/2017 | Bradbury ............ G06F 12/0808 |
| 2019/0227804 A1* | 7/2019 | Mukherjee ............ G06F 9/3806 |

OTHER PUBLICATIONS

Paul Kocher, et al.; "Spectre Attacks: Exploiting Speculative Execution"; https://spectreattack.com/spectre.pdf; Jan. 3, 2018; (16 Pages) (Year: 2018).*

Paul Kocher, et al.; "Spectre Attacks: Exploiting Speculative Execution"; https://spectreattack.com/spectre.pdf; Accessed Date: Feb. 23, 2018; (16 Pages).

* cited by examiner

*Primary Examiner* — Andrew J Steinle
(74) *Attorney, Agent, or Firm* — K&L Gates LLP

(57) ABSTRACT

A system includes a memory, a processor in communication with the memory, and a scanner. The scanner is configured to execute a first simulation instructions and track a register value and/or a stack value while executing the simulation. Responsive to encountering a conditional branch, the scanner is configured to split the first simulation into a second simulation and a third simulation to follow respective legs of the conditional branch. The scanner is also configured to track a movement from a register and/or a stack associated with the memory, record the movement and instruction associated with the movement, and report potential vulnerabilities.

20 Claims, 8 Drawing Sheets

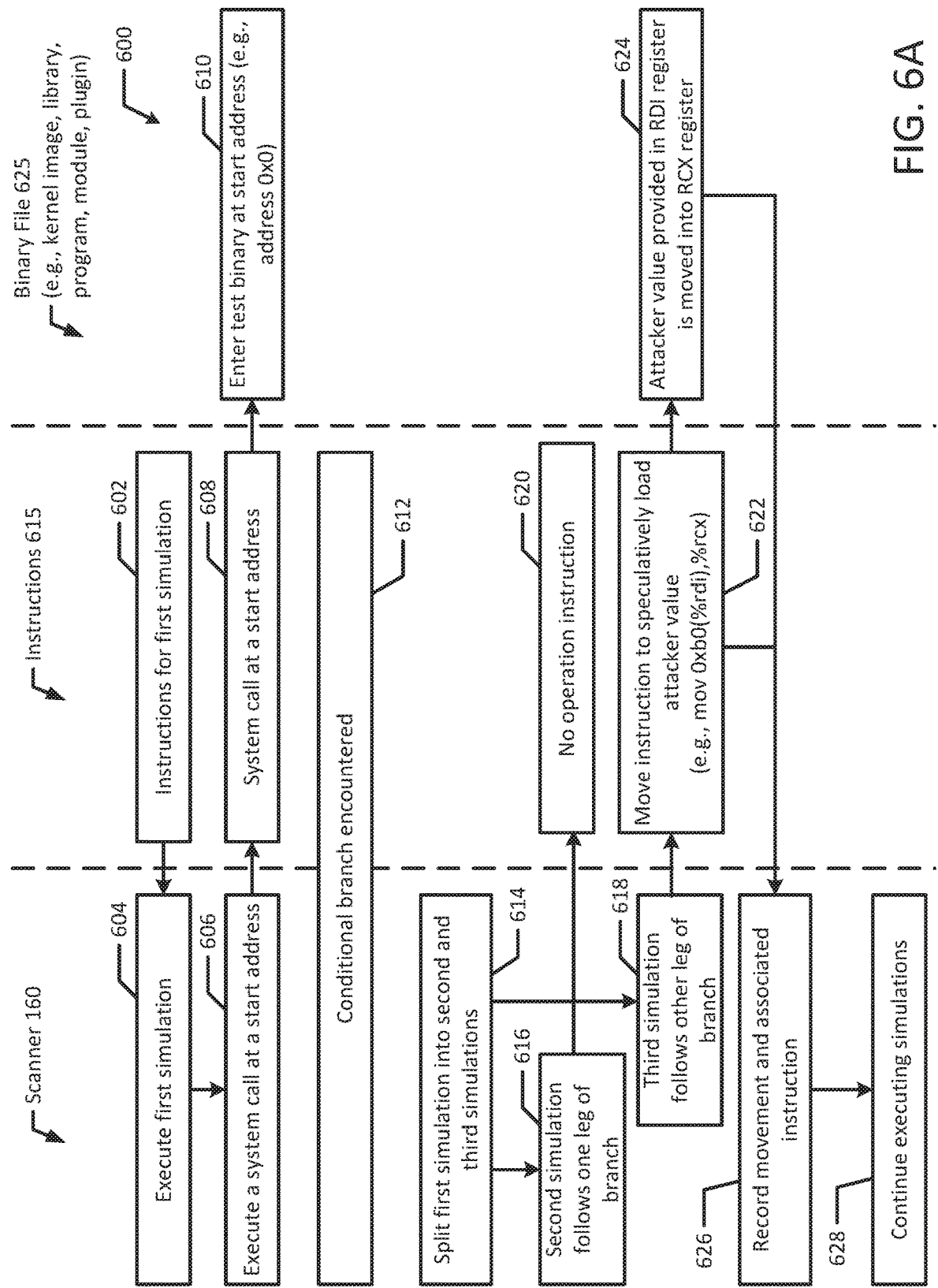

DETERMINING LOCATION OF SPECULATION DENIAL INSTRUCTIONS FOR MEMORY ACCESS VULNERABILITIES

BACKGROUND

Computer systems may routinely perform tasks and execute instructions, such as read, write, and copy memory entries, according to an assigned task or set of instructions. The processors may use physical resources, such as a hardware threads to complete tasks or work orders. For example, there may be a single hardware thread per core on a processor. Additionally, software threads (e.g., threads created by an application or a program) and their associated instructions may be scheduled to a hardware thread.

To improve efficiency, instructions may be executed out-of-order or speculatively. Optimization techniques such as speculative execution involve computer systems or processors performing tasks that may not be needed or before it is known whether they are actually needed, so as to prevent a delay that would have to be incurred by waiting for information. For example, in order to improve performance and utilization of computer resources, instructions can be scheduled or speculatively executed while a processor is waiting for uncached data. If it turns out the work was not needed after all, most changes made by the speculative work are reverted or rolled-back and the results are ignored.

SUMMARY

The present disclosure provides new and innovative systems and methods for determining location of speculation denial instructions (e.g., load fences) for Spectre vulnerabilities or the like. In an example, a system includes a memory, a processor in communication with the memory, and a scanner. The scanner is configured to execute a first simulation of a set of instructions and track a register value and/or a stack value while executing the simulation of the set of instructions. Additionally, the scanner is configured to split the first simulation into a second simulation and a third simulation responsive to encountering a conditional branch. The second simulation and the third simulation follow respective legs of the conditional branch. The scanner is also configured to track a movement from a register and/or a stack associated with the memory, record the movement and an instruction of the set of instructions associated with the movement, and report a potential vulnerability.

In an example, a method includes executing, by a scanner, a first simulation of a set of instructions and tracking, by the scanner, a register value and/or a stack value while executing the first simulation of the set of instructions. Responsive to encountering a conditional branch, the scanner splits the first simulation into a second simulation and a third simulation. The second simulation and the third simulation follow respective legs of the conditional branch. Additionally, the scanner tracks a movement from a register and/or a stack, records the movement and an instruction of the set of instructions associated with the movement, and reports a potential vulnerability.

In an example, a method includes testing a set of instructions with a scanner, monitoring execution of the set of instructions, and determining a potential vulnerability in the set of instructions. The potential vulnerability is associated with a data movement instruction. Additionally, the data movement instruction involves a data movement in cache memory, and the potential vulnerability is detected by the scanner. The method also includes eliminating the potential vulnerability with a load fence positioned at a conditional branch associated with the potential vulnerability. The load fence prohibits execution of the conditional branch.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 6A and 6B illustrate a flow diagram of an example process for determining Spectre vulnerabilities so the vulnerabilities can be remedied with load fences or other speculation denial instructions, according to an example embodiment of the present disclosure.

DETAILED DESCRIPTION OF EXAMPLE EMBODIMENTS

Figure 1:
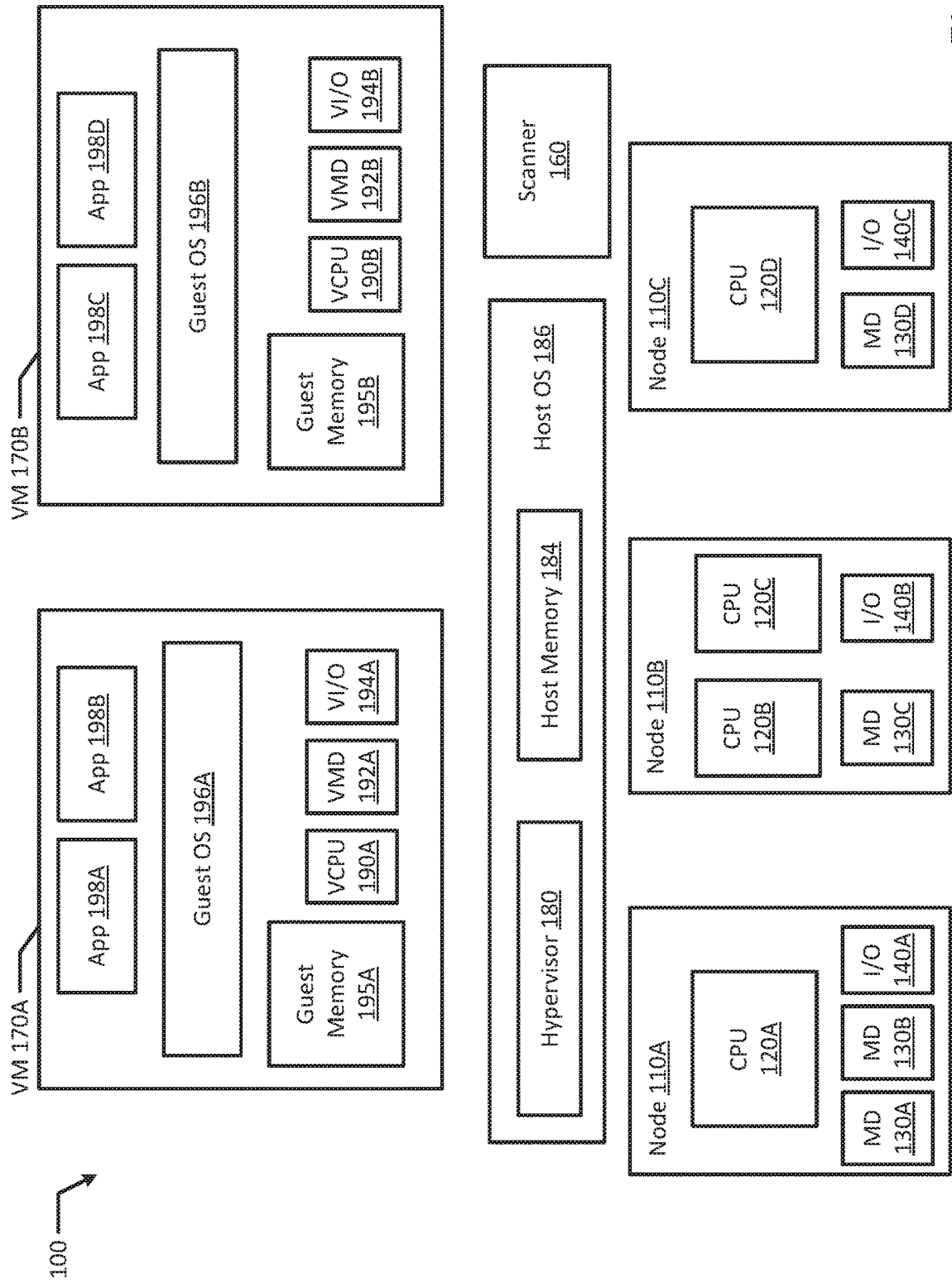
FIG. 1 illustrates a block diagram of an example computing system according to an example embodiment of the present disclosure.

Systems and methods are disclosed for determining location(s) of load fences or other denial instructions (e.g., barriers or pause instructions) for processor vulnerabilities, for example, Spectre vulnerabilities. For example, the disclosed systems and methods may be used to detect potential vulnerabilities (e.g., memory access vulnerabilities) in instructions so safeguards can be preemptively added to the instructions to prevent attacks, such as Spectre "variant 1" type attacks.

Modern processors typically employ speculative execution to reduce processing times. Speculative execution is a technique used by high-speed processors in order to increase performance by guessing likely future execution paths and/or prematurely executing instructions from the execution paths. For example, a processor may execute instructions along both legs of a speculative branch (e.g., a "true" branch and a "false" branch) before determining whether the "if statement" associated with the speculative branch is actually true or false. Once the processor knows whether the "if statement" is true or false, the processor has a head start on each leg of the speculative branch, which speeds up processing overall. Processors may also perform speculative execution during idle times, for example, while waiting on uncached values located in physical memory, which may take several hundred clock cycles before the value becomes known. Rather than wasting the cycles by idling, the processor may save a checkpoint of its register state and proceed with speculative execution. After the value arrives from memory, the processor checks the correctness of the guess, and if the guess was wrong, the processor discards the (incorrect) speculative execution by reverting the register state back to the stored check-point, which results in performance comparable to idling. However, if the guess is correct, the speculative execution results are committed, which yields significant performance gains. For example, instead of wasting computational time by idling, the processor performed useful work during the delay.

Spectre attacks exploit vulnerabilities (e.g., hardware vulnerabilities) in modern processors due to their tendencies speculatively execute instructions, which allows a program to steal data that is currently processed on a computer. Typically, a computer program is not permitted to read data from other programs. However, malicious programs may exploit Spectre vulnerabilities to obtain information from protected memory (e.g., secrets) or secrets stored in the memory of other running programs. For example, business-critical information, passwords, and other protected information may be revealed as a result of a Spectre attack. Specifically, Spectre breaks the isolation between different applications and allows an adversary or attacker to trick programs, even when following best practices (e.g., using speculative execution to increase performance), into leaking secrets. In some cases, the safety checks (e.g., reverting or rolling back the register state) associated with programs following best practices may make applications more susceptible to Spectre attacks. For example, by tricking a processor into speculatively executing instruction sequences that should not have executed during correct program execution, changes to other parts of the central processing unit ("CPU")(such as cache contents) are created, which can survive CPU or register state revisions. Even though the effects of the instructions on the CPU state or register state are reverted or rolled-back, the changes to cache that survive the roll-back are vulnerable and can be exploited to uncover otherwise protected memory.

To prevent malicious attacks, such as Spectre attacks, the techniques disclosed herein advantageously provide a scanner to simulate the execution of instructions and locate vulnerabilities, which can then be remedied with speculation denial instructions. For example, the scanner executes a simulation of a set of instructions and tracks register value(s) and/or stack value(s) while executing the simulation. By tracking register and/or stack values, the scanner can determine when register or stack values change, such that they are different than a saved register state or checkpoint. Additionally, the scanner splits the simulation when encountering a conditional branch such that the simulation follows each leg of the conditional branch to ensure all parts of the instruction are analyzed. The scanner tracks movement(s) from the register and/or stack, records the movement(s) and instruction(s) associated with the movement(s), and reports any potential vulnerabilities. For example, each movement may result in a protected memory value being stored in cache or altering a cache state, which may survive a register state reversion and thus be available to an attacker or adversary. Once the vulnerabilities are identified, speculation denial instructions may be placed at the appropriate conditional branches to prevent any exploitable changes in cache, register and/or stack values, and thus prevent any security breaches that may occur as a result of a Spectre attack that exploits the speculative execution tendencies of processors.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-C), and scanner 160. It should be appreciated that FIG. 1 illustrates one example computing system with scanner 160 for detecting Spectre vulnerabilities. Other systems may include containers or other containerized components, more or less virtualized components (e.g., virtual machines), etc. In other examples, the system may not include containerized and/or virtualized components.

Scanner 160 simulates instructions to detect vulnerabilities, such as Spectre vulnerabilities. The scanner 160 may simulate instructions from a start address until the code reaches a return instruction. Additionally, scanner 160 may track register and stack values and/or movements during the simulation. For example, the scanner 160 may track anything that comes into or leaves the register or stack (e.g., addresses, instructions, bit sequences). As the scanner 160 encounters conditional branches in the code, the scanner 160 may split the simulation to simultaneously follow each leg of the conditional branch, thereby mimicking the behavior of a typical processor (e.g., CPU) and ensuring that each branch is analyzed for any possible vulnerabilities. The scanner 160 also keeps a record of instructions encountered and which of these instructions may trigger speculation, which may be used by an attacker to load values from restricted memory. The scanner 160 may report these vulnerabilities, in the form of a log or a generated report, such that the vulnerabilities can be remedied with speculation denial instructions.

When a simulation is split, the resulting simulations that follow respective legs of a conditional branch may be considered "new simulations" such that a first simulation is split into the second simulation and a third simulation. However, a leg of a conditional branch may also be considered an extension of an existing simulation such that the first simulation continues down one leg of a conditional branch while another simulation, e.g., a second simulation proceeds down the other leg.

While running simulations, the scanner 160 may also track program data, which may reduce the likelihood of reporting false positives thereby reducing the amount of time to review the generated log or vulnerabilities report. However, scanner 160 may run simulations more quickly if program data is not tracked, which may allow for more sections of code, instructions, and/or memory regions to be scanned and simulated. In an example, scanner 160 may be configured to track program data, however, the option to track program data may be disabled for faster scanning. The vulnerability report identifies each instance of a potential vulnerability, which may be used to determine which specific speculative instructions may result in a security breach. The security breaches may be prevented with speculation denial instructions to prevent the speculative execution that leads to the breach. By eliminating speculative execution for the portions of code that result in a security breach and allowing a processor to speculatively execute for the remaining portions of code, the scanner advantageously improves security without eliminating all of the benefits of speculative execution. For example, scanner 160 balances performance and security optimizations. Eliminating speculative execution entirely may result in dramatic performance losses. By eliminating false positives, speculation denial instructions may be placed in areas that pose actual security threats, instead of each reported threat.

Virtual machines 170A-B may include a guest OS, guest memory, a virtual CPU ("VCPU"), virtual memory devices ("VIVID"), and virtual input/output devices ("VI/O"). For example, virtual machine 170A may include guest OS 196A, virtual machine memory or guest memory 195A, a virtual CPU 190A, a virtual memory device 192A, and a virtual input/output device 194A. Similarly, virtual machine 170B may include guest OS 196B, virtual machine memory or guest memory 195B, a virtual CPU 190B, a virtual memory device 192B, and virtual input/output device 194B.

The computing system 100 may also include a hypervisor 180 and host memory 184. Hypervisor 180 may manage host memory 184 for the host operating system 186 as well as memory allocated to the virtual machines 170A-B and guest operating systems 196A-B such as virtual machine memory or guest memory 195A-B provided to guest OS 196A-B. Host memory 184 and virtual machine memory 195A-B may be divided into a plurality of memory pages that are managed by the hypervisor 180.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine (e.g., virtual machine 170A-B).

Guest applications 198A-D may access memory pages of virtual machine memory or guest memory 195A-B. The memory may be mapped such when a guest is accessing guest memory 195A-B, the guest applications 198A-D are actually using or accessing physical memory. Portions of memory may be designated for specific purposes. For example, some of the physical memory may be designated specifically for the operating system or kernel such that user programs are restricted from accessing the operating system memory. For example, the memory for the operating system or kernel may have a permission that restricts access from user programs. Thus, when a process (e.g., a process running in user mode) attempts to access the memory, the access attempt will trigger a page fault at which point the operating system may terminate the request. However, if a process is running in kernel mode (e.g., during a system call), a processor may allow access to the restricted memory.

Other memory, for example, guest memory 195A-B may be designated for users or user programs. The virtual memory or guest memory 195A-B is backed by physical memory. Additionally, some of the physical memory may be unallocated and not assigned to any user programs.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect ("PCI") device, storage devices, disk drives, sound or video adaptors, photo/video cameras, printer devices, keyboards, displays, etc.

As used herein, physical processor or processor 120A-D refers to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-D may be provided by one or more local buses of suitable architecture, for example, peripheral component interconnect ("PCP").

Figure 2:
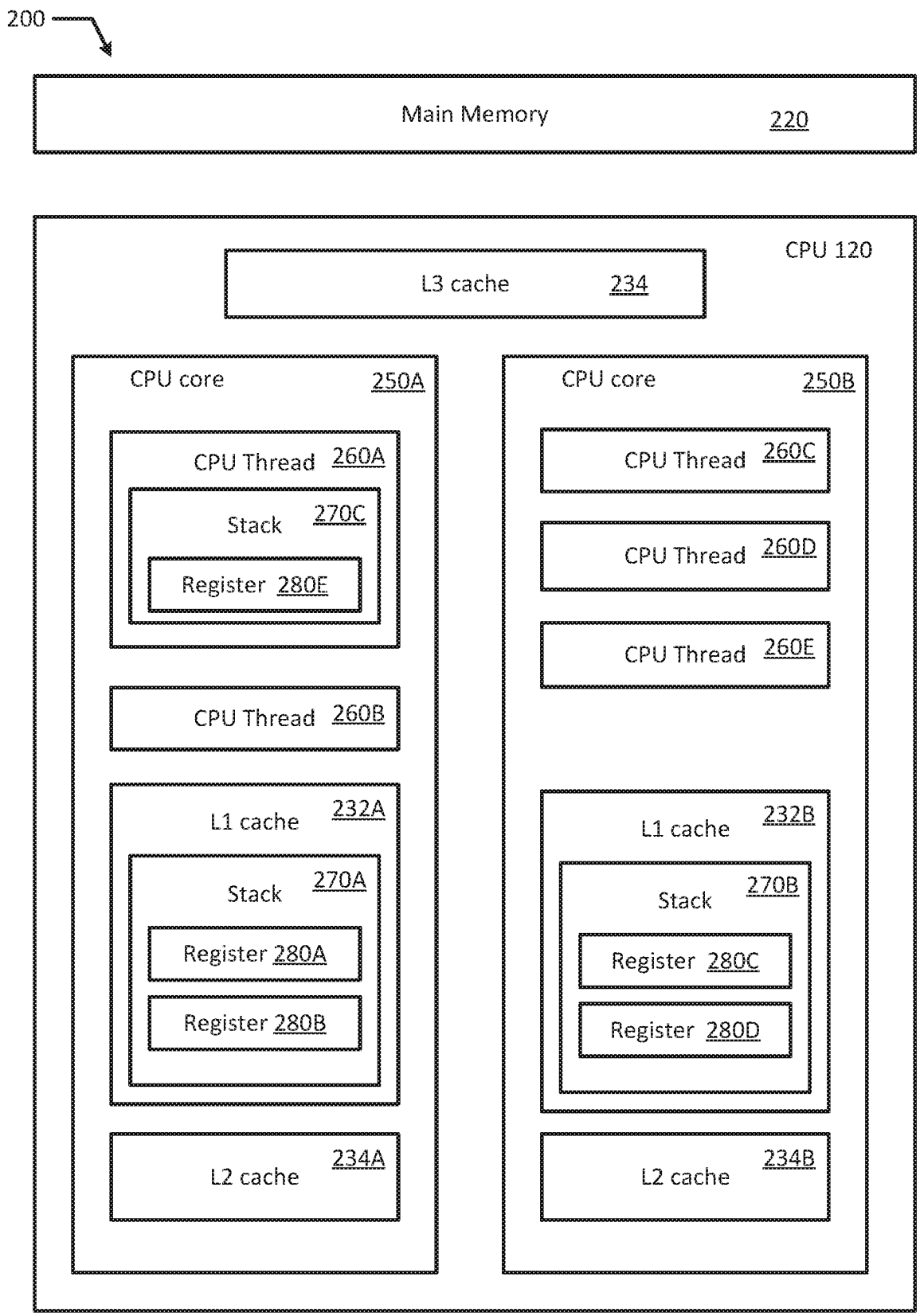
FIG. 2 illustrates a block diagram of example processor and cache architecture according to example embodiments of the present disclosure.

FIG. 2 depicts a high-level component diagram of an example processor and cache architecture 200 in accordance with one or more aspects of the present disclosure. A processor or CPU 120 may include several levels of cache memory (e.g., L1 cache, L2 cache, and L3 cache). Additionally the processor may include one or more cores that execute various threads. A processor or CPU 120 may communicate with main memory 220, such as other physical memory of the system, e.g., system 100. Main memory 220, for example Random Access Memory ("RAM"), is a memory unit that directly interacts with the central processing unit (CPU) 120. In an example, main memory 220 is a volatile source of data. Main memory 220 or RAM may be connected with the processor 120 by its address and data buses. External disk memory may also be connected to main memory 220. Additionally, main memory 220 may be built from Dynamic RAM ("DRAM") or DRAM chips.

As illustrated in FIG. 2, CPU 120 includes L1 cache 232A-B, L2 cache 234A-B, and L3 cache 234. Typically, the cache levels closer to a CPU thread are smaller, faster, and more expensive. Cache levels further away from the processor 120 and closer to main memory 220 are typically larger, slower, and less expensive. In some instances, cache may be used to store stacks and/or registers. In the illustrated example, L1 cache 232A stores stack 270A with registers 280A-B. Registers may be volatile or nonvolatile registers. Similarly, L1 cache 232B stores stack 270B with registers 280C-D.

Processor or CPU 120 includes two CPU cores 250A-B. In an example, CPU 120 may include a single core (e.g., core 250A). Alternatively, CPU 120 may include more than two cores, for example four cores, 8 cores, 16 cores, etc. The CPU cores 250A-B include various hardware threads or CPU threads 260A-E. The CPU threads may include a set of stacks and/or registers (e.g., stack 270C and register 280E). Each thread 260A-E may execute instructions much like a software thread. In the illustrated example, CPU threads 260A-B use the same L1 cache 232A and L2 cache 234A. Similarly CPU threads 260C-E use the same L1 cache 232B and L2 cache 234B. Additionally, CPU cores 250A-B may share an L3 cache 234.

While executing instructions (e.g., machine instructions), a CPU thread 260A-E may execute some of the instructions out-of-order. For example, while executing instructions, a cache miss may add a substantial delay to program execution. In order to mitigate the delay, processor 120 may speculatively execute additional instructions ahead and out-of-order while waiting for memory associated with the current instruction to lead. For example, a program may involve computing a first value if something is true or computing a second value if something is false (e.g., if "A" is true, compute function "X"; if "A" is false, compute function "Y"). A processor 120 may compute both the first value (e.g., function "X") and the second value (e.g., function "Y") before the processor 120 determines whether the "if statement" (e.g., "A") is true or false. Once the processor 120 knows whether "A" is true or false, the processor 120 has a head start on each leg of the speculative branch, which speeds up processing overall. In other instances, a processor 120 may speculatively execute and compute a function that is used frequently during idle times so that the processor 120 will have the value on hand when it is needed, presumably in the near future. However, this type of speculative execution leads to memory access vulnerabilities (e.g., Spectre vulnerabilities) because the output by speculative execution is often stored in cache, which is in part how speculative execution speeds up processing. Storing the values in cache can alter the cache state, and the cache state may survive reverting or rolling-back a saved register state or checkpoint. The altered cache state can be exploited by an attacker to uncover information about protected memory. Several illustrations of Spectre vulnerabilities are illustrated in the following examples below.

Example 1

Figure 3:
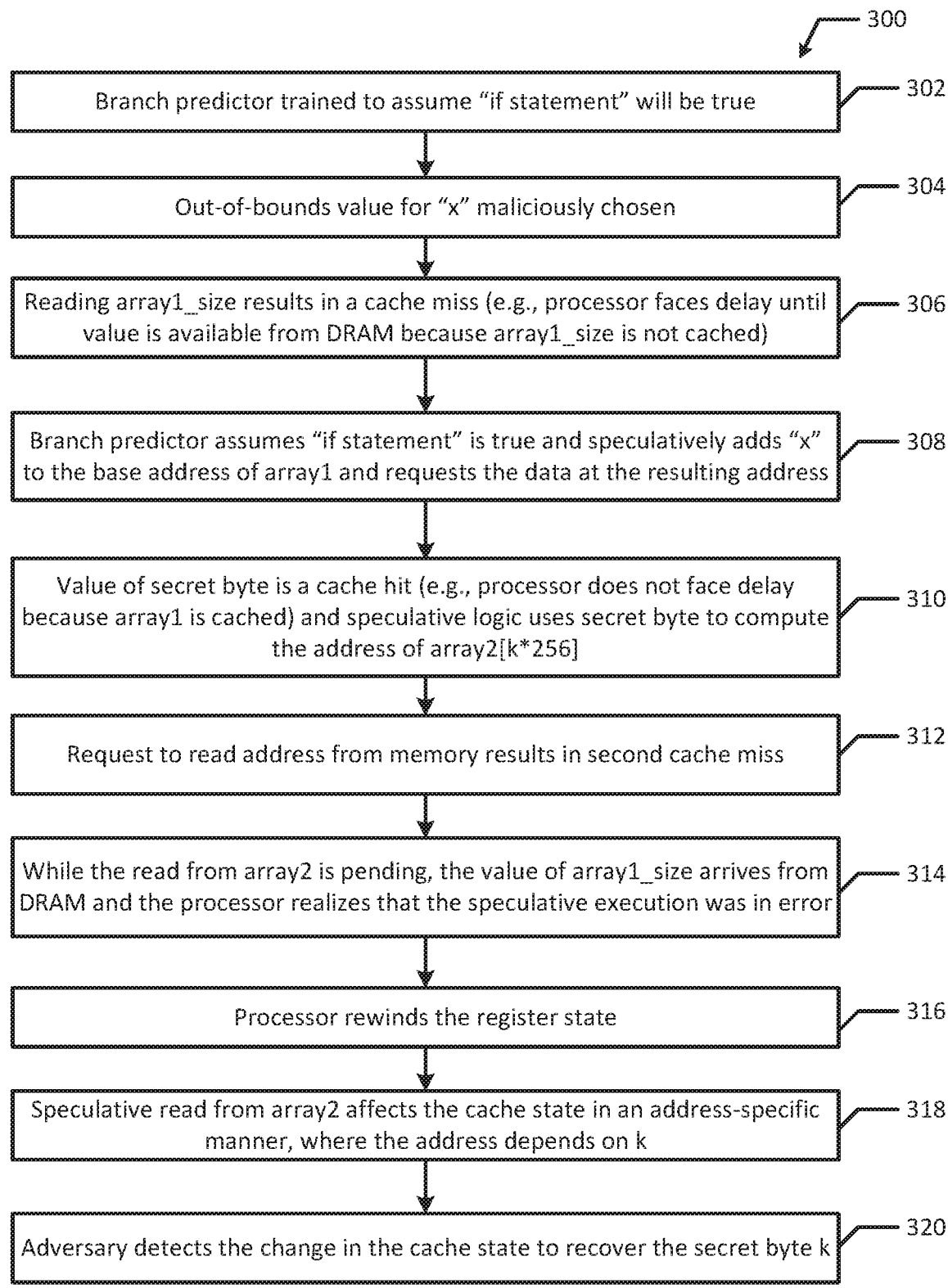
FIG. 3 illustrates a flowchart of an example Spectre attack, according to the present disclosure.

The following example is illustrated in conjunction with FIG. 3, which illustrates an example Spectre attack for the following section of code.

```
if (x < array1_size) {
    y = array2[array1[x] * 256];
}
```

For Example 1, an attacker may control "x". In the example, array1_size is not available in cache (e.g., not cached) and the address of array2 is not available in cache. However, the address of array1 is available in cache (e.g., cached). Additionally, array1[x] resolves to a secret byte "k" in memory, which is cached. The "if statement" may be to verify that the value of "x" is within a legal range, thereby ensuring that the access to array1 is valid. For example, values of "x" outside of the legal range may result in access to protected memory. An adversary or attacker may condition or train a branch predictor to assume an "if statement" will be true (block 302). During a setup phase of an attack, the adversary may pass the sample code several valid values of "x" (e.g., values that are less than the size of array1). In addition to training the processor to expect a certain value, an adversary may perform targeted memory reads that cause the processor to evict certain values from cache, for example, values that are required to determine the destination of a branching instruction. Additionally, an adversary can also prepare a side channel that will be used for extracting the victim's information, e.g., by performing a flush or evict portion of a "flush+reload" or "evict+reload" attack.

In a "flush+reload" or "evict+reload" attack, an adversary may flush an address that maps to a chosen cache line. Then, the adversary may wait for a victim's process to do something. Additionally, the adversary may determine the time it takes to access the address again. For example, if accessing the address again is slow, then the address that mapped to the chosen cache line was not accessed by the victim. However, if accessing the address again is fast, then the address that was mapped to the chosen cache line was accessed by the victim.

Once the processor 120 is conditioned to expect that the value of "x" will likely be less than array1_size, the processor 120 may speculatively execute additional instructions, such as computing "y" to save time. For example, while waiting on the determination from the "if statement", the processor 120 can speculatively execute the value of "y" before waiting on the result from the "if statement". If the processor 120 guesses correctly, the processor 120 can continue to execute instructions having saved time. Conversely, if processor 120 guessed incorrectly, the speculative calculations can be thrown out (e.g., register state can be rolled back) without losing much time.

Then, an out-of-bounds value for "x" is maliciously chosen (block 304). For example, an adversary may invoke the code with a value of "x" outside the bounds of array1 and with array1_size uncached. Thus, reading array1_size results in a cache miss (block 306). Due to the cache miss, the processor faces a delay until the value is available from dynamic random-access memory ("DRAM"). During the delay, the processor 120 speculatively executes instructions for the potential performance gains. The branch predictor assumes the "if statement" is true and speculatively adds "x" to the base address of array1 and requests the data at the resulting address (block 308).

The value of a secret byte "k" is a cache hit and speculative logic uses the secret byte to compute the address of array2[k*256] (block 310). For example, the processor expects that the bounds value check will be true and speculatively executes the read from array2[array1[x]*256] using the malicious "x". In this example, array1 [x] is already stored in cache. However, the request to read the address from memory results in a second cache miss (block 312). Specifically, the request to read the address of array2[k*256] from memory results in a cache miss because the address of array2 is not cached. While the read from array2 is pending, the value of array1_size arrives from DRAM and the processor realizes that the speculative execution was in error. (block 314). For example, the processor realizes that the malicious value of "x" was outside the bounds of the "if statement" and that the speculative execution should be discarded.

Then, the processor rewinds the register state (block 316), which may be a checkpoint of the register state that the processor saved prior to performing the speculative execution at block 308. However, the speculative read from array2 affects the cache state in an address-specific manner, where the address depends on the secret byte "k" (block 318). For example, the speculative read loads data into the cache at an address that is dependent on array1[x] using the malicious "x".

Due to the affected cache state, which survives the reversion or rolling back of the register state, the adversary can exploit the Spectre vulnerability. The adversary detects the change in the cache state to recover the secret byte "k" (block 320). Additionally, by repeating with different values of "x", the above vulnerability can be exploited repeatedly to read the victim's memory. For example, if array2 is readable by the adversary, the next read to array2[n*256] will be fast for n=k and slow for all other values of "n". Additionally, an adversary can immediately call the target function again with an in-bounds or valid value "x'" and measure how long the second call takes. If array1 [x'] equals "k", then the location accessed in array2 will be in the cache and the operation will tend to be faster than if array[x'] does note equal "k". By comparing the time required to return specific values, secret byte "k" can be uncovered. For example, employing the above memory comparison, when called repeatedly, can solve for memory bytes as desired. Otherwise, a prim-and-probe attack can infer secret byte "k" by detecting the eviction caused by the read from array2.

Example 2

The following example illustrates another example Spectre attack for the following section of code.

```
struct array {
    unsigned long length;
    unsigned char data[ ];
};
struct array *arr1 = ...;
unsigned long untrusted_offset_from_caller = ...;
if (unstrusted_offset_from_caller < arr1→length) {
    unsigned char value = arr1→data[untrusted_offset_from caller];
    ...
```

In the example above, arr1→length is uncached, and the processor can speculatively load data from arr1→data[untrusted_offset_from_caller], which is an out-of-bounds read. However, in the following code sample, there is an issue.

If arr1→length, arr2→data[0x200] and arr2→data [0x300] are not cached, but all other accessed data is, and the branch conditions are predicted as true, the processor 120 can do the following speculatively before arr1→length has been loaded. For example, the processor 120 can load (value=arr1→data[untrusted_offset_from_caller]) and start the load from a data-dependent offset in arr2→data, loading the corresponding cache line into the L1 cache.

```
struct array {
    unsigned long length;
    unsigned char data[ ];
};
struct array *arr1 = ...; /* small array */
struct array *arr2 = ...;/* array of size 0x400 */
/* >0x400 (OUT OF BOUNDS!) */
unsigned long untrusted_offset_from_caller = ...;
if (unstrusted_offset_from_caller < arr1→length) {
    unsigned char value = arr1→data[untrusted_offset_from caller];
    unsigned long index2 = ((value&1) *0x100) + 0x200;
    if (index2 < array2→length) {
        unsigned char value2 = arr2→data[inex2];
    }
}
```

After the execution has been returned to the non-speculative path because the processor 120 has noticed that "untrusted_offset_from_caller" is bigger than "arr1→length", the cache line containing "arr2→data[index2]" stays in the L1 cache. By measuring the time required to load "arr2→data[0x200]" and "arr2→data [0x300]", an attacker or adversary can determine whether the value of "index2" during speculative execution was "0x200" or "0x300", which may disclose whether "arr1→data[untrusted_offset_from_caller]&1" is a "0" or "1".

Figure 4:
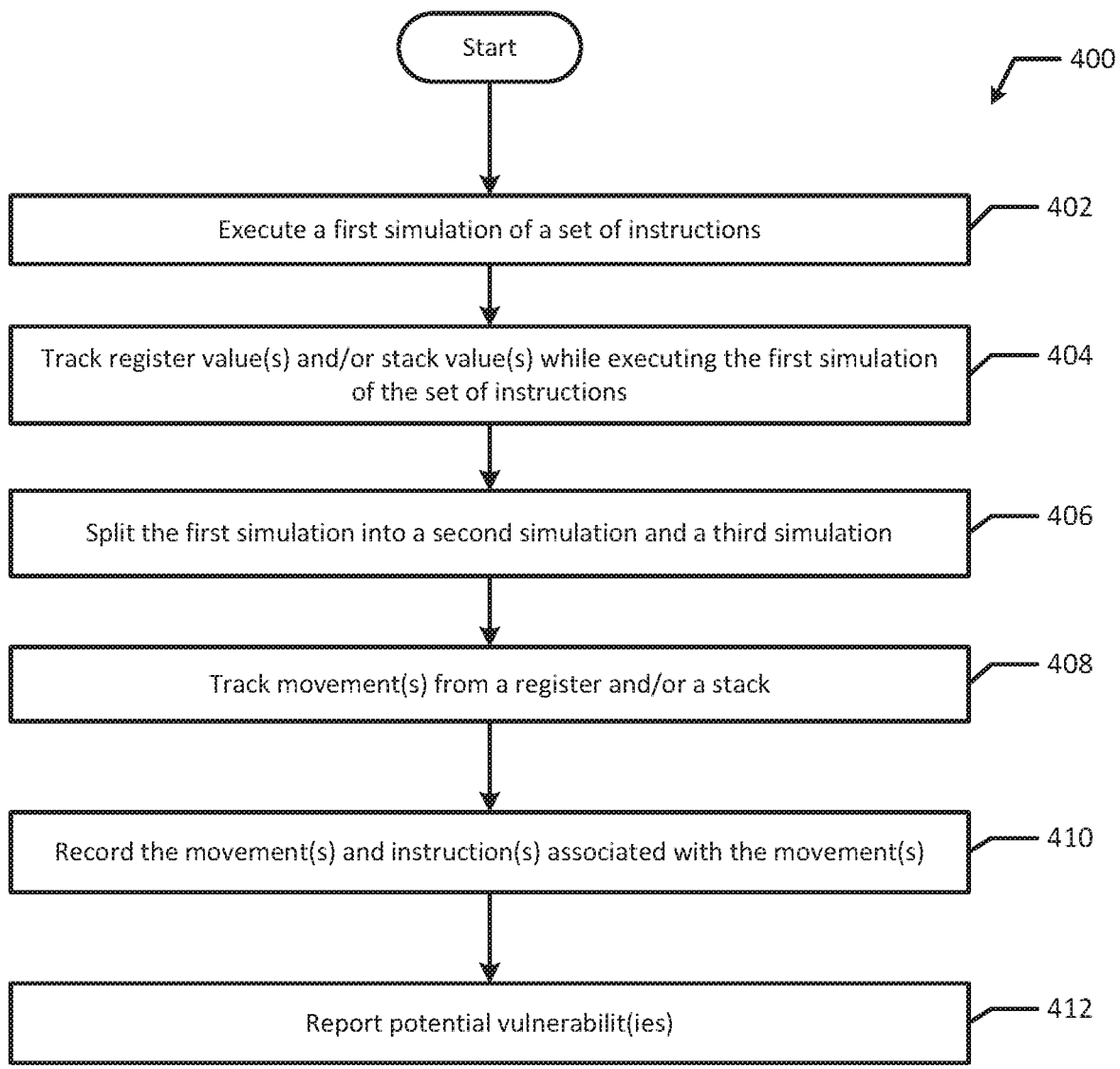
FIG. 4 illustrates a flowchart of an example process for reporting Spectre vulnerabilities, according to an example embodiment of the present disclosure.

FIG. 4 illustrates a flowchart of an example method 400 for reporting Spectre vulnerabilities, according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes executing a first simulation of a set of instructions (block 402). For example, a scanner 160 may execute a first simulation from a start address (e.g. 0100) associated with a set of instructions. By limiting the simulation to a single start address, the simulation may analyze instructions associated with a region of memory. To start the simulation, the scanner 160 may be invoked with a path to a binary file. In other examples, the scanner 160 may examine additional code paths through a binary (e.g., binary file) at various start addresses. In an example, the start address may be a system call entry point or an external function entry point into the binary, such as library. For example, the start address may be inside the binary file (e.g., any file that does not contain human-readable text). Binary files may include a kernel image or module, a program (e.g., a compiled program), a library containing compiled code, a module, a plugin, etc. Then, register value(s) and/or stack value(s) are tracked while executing the first simulation of the set of instructions (block 404). For example, the scanner 160 may track register values and/or stack values, e.g., anything that comes into or leaves the register 280 or stack 270 such as addresses, bit sequences, etc.

Next, the first simulation is split into a second simulation and a third simulation (block 406). For example, responsive to encountering a conditional branch, the scanner 160 may split the simulation into two simulations (e.g., second simulation and third simulation) that follow each respective leg of the conditional branch. A second simulation will follow one leg of the conditional branch while a third simulation will follow the other leg of the conditional branch to mimic the behavior of a typical processor 120. By running simulations for each leg of a conditional branch, the scanner 160 advantageously analyzes each possible instruction that may lead to a Spectre vulnerability.

Movement(s) from a register and/or a stack are tracked (block 408). For example, the scanner 160 may track movement(s) from a register 280 or a stack 270. Movements may be associated with a data movement instruction to move data from one register 280 or stack 270 to another. The movement(s) and instruction(s) associated with the movement(s) are recorded (block 410). For example, the scanner 160 may record the movement(s) and instruction(s) associated with the movement(s), for example in an event log. Additionally, vulnerabilit(ies) are reported (block 412). For example, the scanner 160 may report vulnerabilities, such as instructions and data movements that trigger speculation, which can be used to load values from restricted memory. These vulnerabilities may be reported in a log file or other report generated by scanner 160. Once reported, the vulnerabilities can be remedied with speculation denial instructions. In an example, the speculation denial instructions may be applied automatically. For example, scanner 160 may automatically apply speculation denial instructions to the associated program code.

Blocks 406 to 410 may be repeated for each conditional branch the simulation encounters. In an example, the quantity of simulations may be limited to an upper limit or maximum quantity of simulations and/or conditional branches. The scanner 160 may default to an upper limit of, for example, 32 consecutive conditional branches (e.g., a maximum of $2^{32}$ simulations). Additionally, the upper limit may be adjustable such that the scanner 160 can be modified to run quicker simulations as well as handle more robust sections of code that include larger quantities of conditional branches. The scanner 160 may also be limited in the total number of instructions handled in any one of the simulation(s) (e.g., the second simulation following a leg of the conditional branch), which helps prevent the scanner 160 for running a simulation that is stuck in a loop. In an example, an instruction threshold may be set such as a threshold of 4096 instructions. Once one of these upper limits or thresholds is met, the respective simulation(s) may be terminated.

The above limits and thresholds are for illustrative purposes only, and the above examples (e.g., 32 consecutive branches, $2^{32}$ simulations, 4096 instructions) are not restrictive. For example, higher or lower limits may be chosen other than those stated above.

Additionally, a simulation may be terminated (e.g., scanner 160 stops executing the simulation) when a speculation denial instruction is encountered for that simulation. For example, if the second simulation reaches a speculation denial instruction, the second simulation may be terminated while the scanner continues to run other simulations (e.g., simulation(s) that are not associated with the speculative branch and speculation denial instruction). Speculation denial instructions prevent speculative execution. For example, load fences (LFENCE), barriers (CSDB), or pause instructions at a conditional branch effectively cause a processor 120 (or in this case the scanner running the simulation) to wait for the appropriate value before choosing the appropriate branch. In some instances, speculation denial instructions may be referred to as memory barriers or fences, which causes a CPU or compiler to enforce an ordering constraint on memory operations issued before and after the barrier instruction (e.g., avoids out-of-order execution). This typically means that operations issued prior to the barrier are guaranteed to be performed before operations issued after the barrier. By avoiding out-of-order execution, the value of an "if statement" is known before proceeding past its associated conditional branch thereby eliminating a speculative execution step at that conditional branch.

Figure 5:
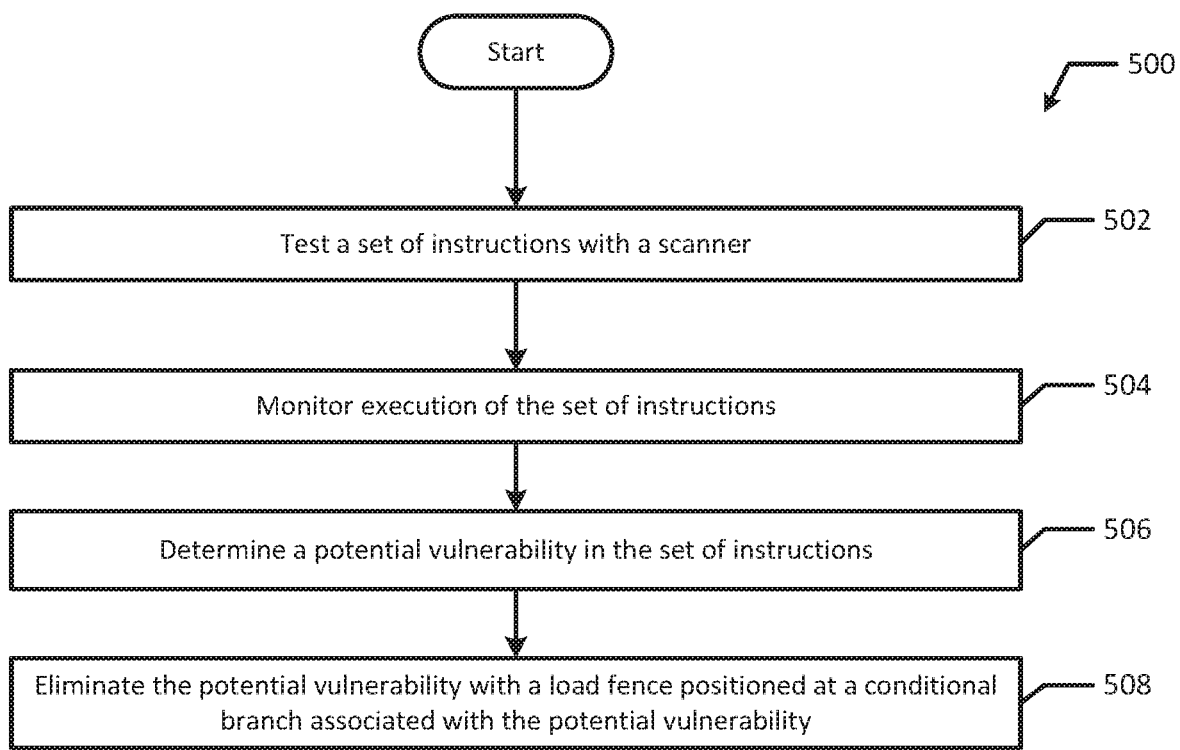
FIG. 5 illustrates a flowchart of an example process for detecting a vulnerability in code and eliminating the vulnerability with a load fence, according to an example embodiment of the present disclosure.

FIG. 5 illustrates a flowchart of an example method 500 for detecting a vulnerability in code and eliminating the vulnerability with a load fence, according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes testing a set of instructions with a scanner (block 502). For example, a scanner 160 may test a set of instructions, which may be associated with a specific start address or region of memory. Then, execution of the set of instructions is monitored (block 504). For example, the scanner 160 may monitor execution of the set of instructions. In an example, the scanner 160 may run a simulation mimicking the behavior of a processor 120 executing the set of instructions.

Next, a potential vulnerability in the set of instructions is determined (block 506). For example, the scanner 160 may determine a potential vulnerability such as a specific instruction that triggers speculation or a data movement instruction that loads values from restricted memory into cache, which can ultimately be exploited and uncovered by an attacker or adversary.

Then, the potential vulnerability is eliminated with a load fence positioned at a conditional branch associated with the potential vulnerability (block 508). For example, a speculative denial instruction or memory barrier, such as a load fence, may be positioned at the conditional branch associated with the potential vulnerability. Specifically, LFENCE does not execute until all prior instructions have completed locally, and no later instruction begins execution until LFENCE completes. In another example, a pause instruction may be used to ensure that previous instructions have time to complete (e.g., pull values from noncached memory) before continuing. As discussed above, memory barriers may be used such that no instructions after the barrier, for example a CSDB barrier, can be speculatively executed using the results of any data value predictions or other predicted values that have not already been resolved.

By positioning speculation denial instructions at the potential vulnerable locations in the code, the risk of Spectre attacks are advantageously eliminated, thereby improving security. In an example, speculation denial instructions may be positioned at a portion of the vulnerable sections of code to allow some speculative execution to remain. Each speculation denial instruction will inherently lower performance as less speculative execution is used, and thus speculation denial instructions may be used in predetermined locations to optimize both security and performance. As discussed above, scanner 160 may also track program data to reduce the number of reported false positives. Additionally, once vulnerabilities are located, the scanner 160 may automatically place speculation denial instructions at the appropriate spots in the program code. By positioning speculation denial instructions at vulnerable code sections while allowing a processor to speculatively execute other portions of code, security is improved while maintaining the performance benefits of speculative execution.

Figure 6B:
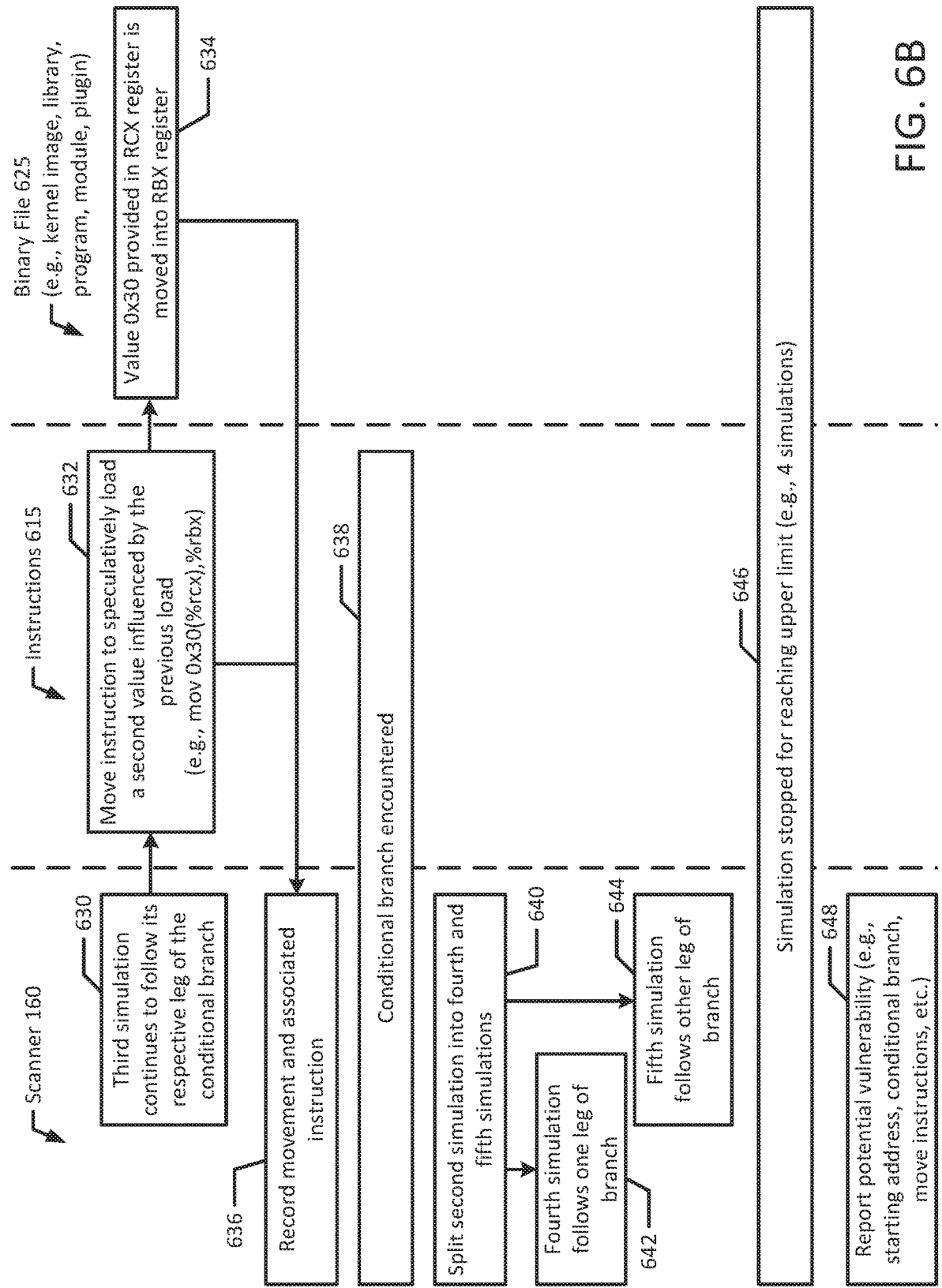

FIGS. 6A and 6B illustrate a flowchart of an example method 600 for determining Spectre vulnerabilities so they can be remedied with load fences or other speculation denial instructions in accordance with an example embodiment of the present disclosure. Although the example method 600 is described with reference to the flowchart illustrated in FIGS. 6A and 6B, it will be appreciated that many other methods of performing the acts associated with the method 600 may be used. For example, the order of some of the blocks may be changed, certain blocks may be combined with other blocks, and some of the blocks described are optional. For example, a scanner 160 may simulate the execution of instructions 615 and manipulate a binary file 625 to perform example method 600.

In the illustrated example, a set of instructions 615 are set to be tested (block 602). For example, the set of instructions 615 may include all instructions 615 from a start address until the code reaches a return instruction, e.g., a return to the instruction 615 that called the start address. The set of instructions may also be associated with a region of memory. The scanner 160 executes a first simulation (block 604). For example, the scanner 160 may be invoked with a path to a binary file 625 to run a first simulation in the binary file 625. In the illustrated example, to start the simulation, the scanner 160 executes a system call at a start address (block 606) according to the system call instruction 615 (block 608). By running a simulation at a start address, the scanner 160 may produce targeted output for a smaller region of memory or for a smaller set of instructions 615. In other scenarios, the scanner 160 may be used to examine all possible code paths through a binary file 625, however some of these code paths may not typically be accessible to an attacker and may result in cumbersome output logs. Due to the simulation, the test binary file 625 at the start address is entered (block 610). For example, the binary file 625 is entered at address 0x0, which may be indicated as 000000: nop (e.g., no operation).

Then, a conditional branch is encountered (block 612). For example, a conditional jump at address 0x1 may trigger speculation such as a conditional branch, which may be indicated as 000001:jne &0xe (e.g., conditional jump at address 0x1). The scanner 160 splits the first simulation into a second simulation and a third simulation (block 614). For example, the scanner may use each simulation to mimic the behavior of a typical processor 120 by following each leg of a conditional branch. Additionally, following each leg of the conditional branch allows the scanner 160 to analyze all portions of code to locate any potential vulnerabilities. The second simulation follows one leg of the conditional branch (block 616) and the third simulation follows the other leg of the conditional branch (block 618). The scanner 160 may continue to run the simulations along each conditional branch simultaneously. In an example, the first simulation may continue to follow one leg of a conditional branch while splitting off a second simulation to follow the other leg of the conditional branch. By splitting the simulations, the scanner 160 may create an additional simulation to join the existing simulation or may create two "new" simulations for each leg of the conditional branch. For example, as illustrated in FIG. 6A, the third simulation may be a continuation of the first simulation such that the first simulation and a second simulation exist after the conditional branch. Alternatively, the scanner 160 may create two "new" simulations such that the first simulation is split into a second simulation and a third simulation.

In the illustrated example, the second simulation following one leg of the conditional branch is not associated with an operation instruction 615 (block 620). For example, the simulation may be idling. The third simulation following the other leg of the conditional branch is associated with a move instruction 615 to speculatively load an attacker value (block 622). For example, the simulation may encounter a move instruction to move or load data from one register 280 to another register 280, which may be indicated as 000010: mov 0xb0(%rdi),%rcx (e.g., move source or 0xb0(%rdi) to destination %rcx). Specifically, the instruction 615 may result in the simulation moving the attacker value from the RDI register to the RCX register (block 624). Various other registers 280 may be implicated in move or load instructions, such as register a extended ("RAX"), register b extended ("RBX"), register c extended ("RCX"), register d extended ("RDX"), register 8 ("R8"), register 9 ("R9"), R10, R11, etc. Then, the attacker value provided in the RDI register is moved into the RCX register. The scanner 160 records the movement and associated instruction 615 (block 626) and continues executing simulations (block 628). For example, the scanner 160 may record the movement and instruction in a log file. The scanner 160 may record both the instruction 615 associated with the move and the instruction 615 that initially triggered the speculation. In an example, the log may indicate whether the instruction 615 triggered speculation with a flag or tag (e.g., "COND") and may also indicate instructions 615 involving movements or loaded values from restricted memory with a flag or tag (e.g., "LOAD").

Continuing on FIG. 6B, the third simulation continues to follow its respective leg of the conditional branch (block 630). Each simulation may continue to follow their respective legs until an upper limit or maximum quantity of simulations and/or conditional branches is reached. Additionally, simulations may be limited to a predetermined quantity or threshold level of instructions handled in any one simulations. The limitations on maximum quantity of conditional branches and/or instructions help control the speed and efficiency of the scanner 160. The next instruction the third simulation encounters is a move instruction 615 to speculatively load a second value influenced by the previous load (block 632). For example, the third simulation may encounter a move instruction 615 to move or load data from one register 280 to another register 280, which may be indicated as 000020: mov 0x30(%rcx), %rbx (e.g., move source or 0x30(%rcx) to destination %rbx). Then, the value 0x30 provided in the RCX register is moved into the RBX register (block 634). The load at address 0x10 using an attacker provided value in (%rdi) may influence the second load at address 0x20.

The scanner 160 records the movement and associated instruction 615 (block 636). As mentioned above, the attacker provided value may influence the second load, and thus the scanner 160 records the movement and associated instruction 615 so that the potential vulnerability can be reviewed. A subsequent conditional branch is encountered during the second simulation (block 638). The scanner 160 splits the second simulation into a fourth simulation and a fifth simulation (block 640). At this point, the scanner 160 has split the first simulation into a total of five simulations. The fourth simulation follows one leg of the subsequent conditional branch (block 642) and the fifth simulation follows the other leg of the subsequent conditional branch (block 644). In an example, the second simulation may continue to follow one leg of a conditional branch while splitting off another simulation to follow the opposite leg of the conditional branch. For example, instead of five simulations, there may only be three simulations depending on whether the scanner 160 creates entire new simulations or continues an existing simulation down a leg of a conditional branch.

Then, the simulation is stopped for reaching an upper limit (block 646). In the illustrated example, the scanner 160 may have an established or predetermined upper limit of simulations set at four simulations. Once the conditional branch is encountered at block 638, the scanner 160 has consecutively run five simulations, which is more than the upper limit (e.g., four simulations). As discussed above, the upper limit may be determined based on how simulations are numbered and split to account for numbering differences between creating two "new" simulations for each branch or for having an existing simulation follow one leg of a conditional branch. After stopping the simulation, the scanner 160 reports potential vulnerabilities uncovered during the simulation (block 648). In an example, the potential vulnerabilities may reported in a log file or other form of report generated by scanner 160. The log file may report each instruction 615 that leads to speculation and/or loading protected memory in cache. The scanner 160 may also report each vulnerability in real time. After speculation denial instructions have been added to the problematic portions of code, the scanner 160 may re-run the simulation to confirm that the detected vulnerabilities have been remedied.

Figure 7:
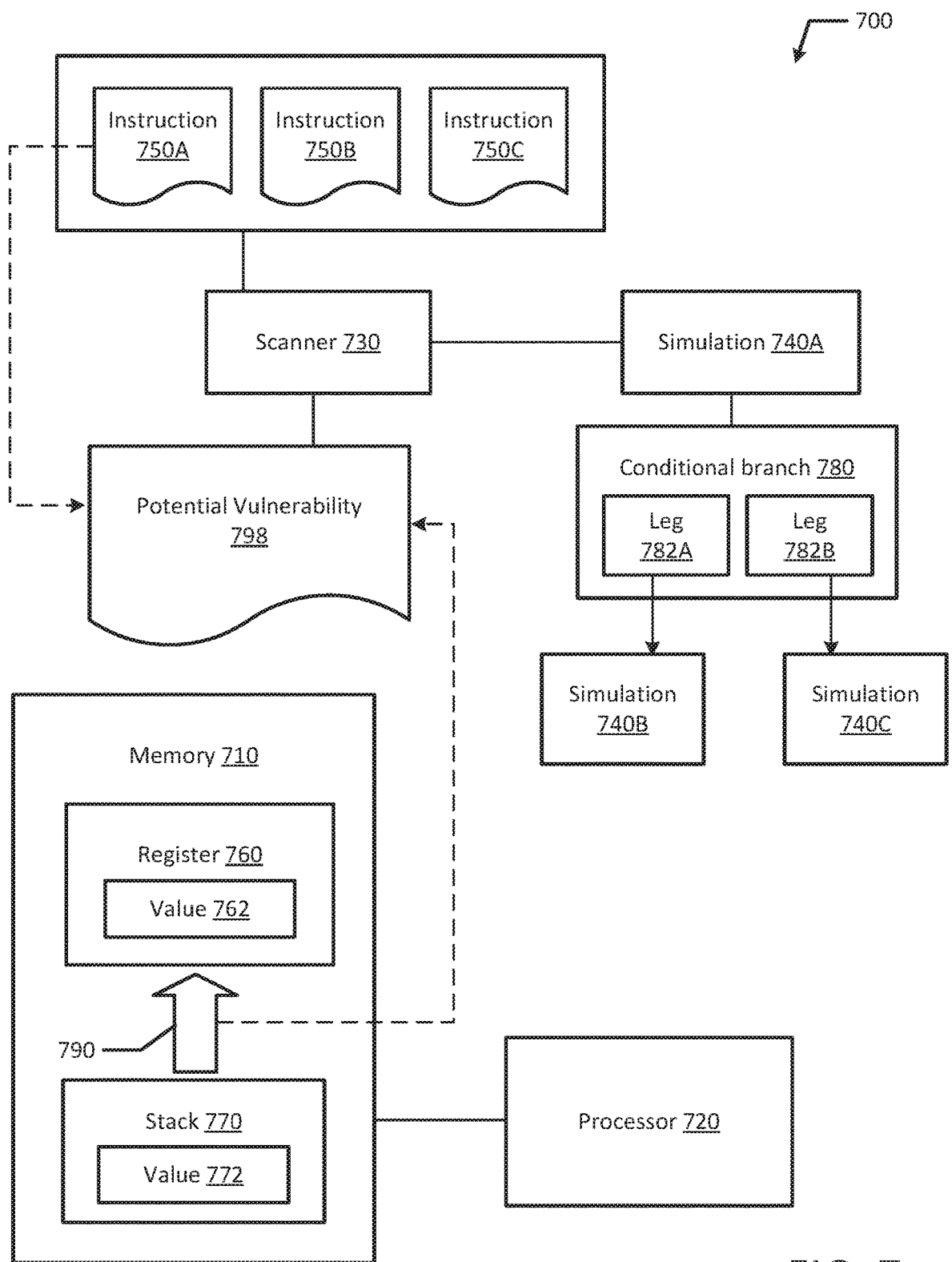
FIG. 7 illustrates a block diagram of an example simulation system for detecting Spectre vulnerabilities, according to an example embodiment of the present disclosure.

FIG. 7 is a block diagram of an example system 700 for detecting Spectre vulnerabilities. The system 700 includes a memory 710, a processor 720 in communication with the memory 710, and a scanner 730. The scanner 730 is configured to execute a first simulation 740A of a set of instructions 750A-C and track a register value 762 and/or a stack value 772 while executing the simulation 740A of the set of instructions 750A-C. Additionally, the scanner 730 is configured to split the first simulation 740A into a second simulation 740B and a third simulation 740C responsive to encountering a conditional branch 780. The second simulation 740B and the third simulation 740C follow respective legs 782A-B of the conditional branch 780. The scanner 730 is also configured to track a movement 790 from a register 760 and/or a stack 770 associated with the memory 730, record the movement 790 and an instruction 750A of the set of instructions 750A-C associated with the movement 790, and report a potential vulnerability 798.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure system includes a memory, a processor in communication with the memory, and a scanner. The scanner is configured to execute a first simulation of a set of instructions and track at least one of a register value and a stack value while executing the simulation of the set of instructions. Additionally, the scanner is configured to split the first simulation into a second simulation and a third simulation responsive to encountering a conditional branch. The second simulation and the third simulation follow respective legs of the conditional branch. The scanner is also configured to track a movement from at least one of a register and a stack associated with the memory, record the movement and an instruction of the set of instructions associated with the movement, and report a potential vulnerability.

In accordance with a 2nd exemplary aspect of the present disclosure, which may be used in combination with any one or more of the preceding aspects (e.g., the 1st aspect), the potential vulnerability is a Spectre vulnerability.

In accordance with a 3rd exemplary aspect of the present disclosure, which may be used in combination with any one or more of the preceding aspects (e.g., the 1st aspect), the memory is cache memory.

In accordance with a 4th exemplary aspect of the present disclosure, which may be used in combination with any one or more of the preceding aspects (e.g., the 1st aspect), the scanner is further configured to track program data associated with at least one of the first simulation, the second simulation, and the third simulation.

In accordance with a 5th exemplary aspect of the present disclosure, which may be used in combination with any one or more of the preceding aspects (e.g., the 1st aspect), the scanner is configured to split the second simulation into a fourth simulation and a fifth simulation responsive to encountering a successive conditional branch, wherein the fourth simulation and the fifth simulation follow respective legs of the successive conditional branch.

In accordance with a 6th exemplary aspect of the present disclosure, which may be used in combination with any one or more of the preceding aspects (e.g., the 5th aspect), the scanner is configured to split the second simulation into a fourth simulation and a fifth simulation responsive to encountering a successive conditional branch, wherein the fourth simulation and the fifth simulation follow respective legs of the successive conditional branch.

In accordance with a 7th exemplary aspect of the present disclosure, which may be used in combination with any one or more of the preceding aspects (e.g., the 1st aspect), the scanner is configured to execute the set of instructions from a start address until a return address.

In accordance with an 8th exemplary aspect of the present disclosure, which may be used in combination with any one or more of the preceding aspects (e.g., the 1st aspect), the scanner is configured to stop executing the simulation responsive to encountering a speculation denial instruction.

In accordance with a 9th exemplary aspect of the present disclosure, which may be used in combination with any one or more of the preceding aspects (e.g., the 8th aspect), the speculation denial instruction is one of a load fence (LFENCE), a barrier (CSDB), or a pause (pause).

In accordance with a 10th exemplary aspect of the present disclosure, which may be used in combination with any one or more of the preceding aspects (e.g., the 1st aspect), a quantity of the set of instructions is limited to a simulation threshold.

In accordance with an 11th exemplary aspect of the present disclosure, which may be used in combination with any one or more of the preceding aspects (e.g., the 1st aspect), the first simulation is restricted to a region of the memory.

In accordance with a 12th exemplary aspect of the present disclosure, which may be used in combination with any one or more of the preceding aspects (e.g., the 1st aspect), the register is stored on the stack, and wherein the register is a CPU register.

Aspects of the subject matter described herein may be useful alone or in combination with one or more other aspects described herein. In a 13th exemplary aspect of the present disclosure, a method includes executing, by a scanner, a first simulation of a set of instructions and tracking, by the scanner, at least one of a register value and a stack value while executing the first simulation of the set of instructions. Responsive to encountering a conditional branch, the scanner splits the first simulation into a second simulation and a third simulation, wherein the second simulation and the third simulation follow respective legs of the conditional branch. Additionally, the scanner tracks a movement from at least one of a register and a stack, records the movement and an instruction of the set of instructions associated with the movement, and reports a potential vulnerability.

In accordance with a 14th exemplary aspect of the present disclosure, which may be used in combination with any one or more of the preceding aspects (e.g., the 13th aspect), the scanner executes the set of instructions from a start address until a return address.

In accordance with a 15th exemplary aspect of the present disclosure, which may be used in combination with any one or more of the preceding aspects (e.g., the 13th aspect), the method further includes tracking, by the scanner, program data associated with at least one of the first simulation, the second simulation, and the third simulation.

In accordance with a 16th exemplary aspect of the present disclosure, which may be used in combination with any one or more of the preceding aspects (e.g., the 13th aspect), the method further includes splitting, by the scanner, the second simulation into a fourth simulation and a fifth simulation responsive to encountering a successive conditional branch, wherein the fourth simulation and the fifth simulation follow respective legs of the successive conditional branch.

In accordance with a 17th exemplary aspect of the present disclosure, which may be used in combination with any one or more of the preceding aspects (e.g., the 16th aspect), the method further includes stopping, by the scanner, each simulation responsive to a quantity of simulations reaching an upper limit.

In accordance with an 18th exemplary aspect of the present disclosure, which may be used in combination with any one or more of the preceding aspects (e.g., the 13th aspect), the method further includes stopping, by the scanner, execution of the respective simulation responsive to encountering a speculation denial instruction.

In accordance with a 19th exemplary aspect of the present disclosure, which may be used in combination with any one or more of the preceding aspects (e.g., the 13th aspect), the scanner executes the set of instructions from a start address until a return address.

In accordance with a 20th exemplary aspect of the present disclosure, which may be used in combination with any one or more of the preceding aspects (e.g., the 19th aspect), the start address is inside a binary file.

In accordance with a 21st exemplary aspect of the present disclosure, which may be used in combination with any one or more of the preceding aspects (e.g., the 20th aspect), the start address is a system call entry point, and the binary file is one of a kernel image, a program, a library, a module, or a plugin.

In accordance with a 22nd exemplary aspect of the present disclosure, which may be used in combination with any one or more of the preceding aspects (e.g., the 20th aspect), the binary file is a library, and the start address is an external function entry point into the library.

In accordance with a 23rd exemplary aspect of the present disclosure, which may be used in combination with any one or more of the preceding aspects (e.g., the 20th aspect), the binary file is one of a program, a library, a module, or a plugin.

In accordance with a 24th exemplary aspect of the present disclosure, which may be used in combination with any one or more of the preceding aspects (e.g., the 13th aspect), the method further includes invoking the scanner with a path to a binary file, wherein the start address is inside the binary file.

Aspects of the subject matter described herein may be useful alone or in combination with one or more other aspects described herein. In a 25th exemplary aspect of the present disclosure, a system includes a means for executing a first simulation of a set of instructions, a means for tracking at least one of a register value and a stack value while executing the first simulation of the set of instructions, and a means for splitting the first simulation into a second simulation and a third simulation responsive to encountering a conditional branch, wherein the second simulation and the third simulation follow respective legs of the conditional branch. The system also includes a means for tracking a movement from at least one of a register and a stack, a means for recording the movement and an instruction of the set of instructions associated with the movement, and a means for reporting a potential vulnerability.

Aspects of the subject matter described herein may be useful alone or in combination with one or more other aspects described herein. In a 26th exemplary aspect of the present disclosure, a non-transitory machine-readable medium storing code, which when executed by a processor, is configured to execute a first simulation of a set of instructions, track at least one of a register value and a stack value while executing the first simulation of the set of instructions, and responsive to encountering a conditional branch, split the first simulation into a second simulation and a third simulation, wherein the second simulation and the third simulation follow respective legs of the conditional branch. The non-transitory machine-readable medium is also configured to track a movement from at least one of a register and a stack, record the movement and an instruction of the set of instructions associated with the movement, and report a potential vulnerability.

Aspects of the subject matter described herein may be useful alone or in combination with one or more other aspects described herein. In a 27th exemplary aspect of the present disclosure, a method includes testing a set of instructions with a scanner, monitoring execution of the set of instructions, and determining a potential vulnerability in the set of instructions, wherein the potential vulnerability is associated with a data movement instruction, wherein the data movement instruction involves a data movement in cache memory, and wherein the potential vulnerability is detected by the scanner. The method also includes eliminating the potential vulnerability with a load fence positioned at a conditional branch associated with the potential vulnerability, wherein the load fence prohibits execution of the conditional branch.

In accordance with a 28th exemplary aspect of the present disclosure, which may be used in combination with any one or more of the preceding aspects (e.g., the 27th aspect), the method further includes determining another potential vulnerability in the set of instructions and eliminating the other potential vulnerability with another load fence positioned at a successive conditional branch.

In accordance with a 29th exemplary aspect of the present disclosure, which may be used in combination with any one or more of the preceding aspects (e.g., the 27th aspect), the potential vulnerability is a Spectre vulnerability.

In accordance with a 30th exemplary aspect of the present disclosure, which may be used in combination with any one or more of the preceding aspects (e.g., the 27th aspect), monitoring execution of the set of instructions includes tracking at least one of a register value and a stack value while executing the set of instructions, tracking a movement from at least one of a register and a stack, and recording the movement and an instruction of the set of instructions associated with the movement.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
  a memory;
  a processor in communication with the memory; and
  a scanner, wherein the scanner is configured to:
    execute a first simulation of a set of instructions,
    track at least one of a register value and a stack value while executing the first simulation of the set of instructions,
    responsive to encountering a conditional branch, split the first simulation into a second simulation and a third simulation, wherein
      the second simulation and the third simulation follow respective legs of the conditional branch,
      a first quantity of the set of instructions in a respective simulation is limited to a first simulation threshold, and
      a second quantity of conditional branches is limited to a second simulation threshold,
    track a movement from at least one of a register and a stack associated with the memory,
    record the movement and an instruction of the set of instructions associated with the movement,
    report a potential vulnerability, and
    place a speculation denial instruction within the set of instructions at a respective conditional branch associated with the potential vulnerability.

2. The system of claim 1, wherein the potential vulnerability is a Spectre vulnerability.

3. The system of claim 1, wherein the memory is cache memory.

4. The system of claim 1, wherein the scanner is further configured to track program data associated with at least one of the first simulation, the second simulation, and the third simulation.

5. The system of claim 1, wherein responsive to encountering a successive conditional branch, the scanner is configured to split the second simulation into a fourth simulation and a fifth simulation, and wherein the fourth simulation and the fifth simulation follow respective legs of the successive conditional branch.

6. The system of claim 5, wherein responsive to a quantity of simulations reaching an upper limit, the scanner is configured to stop each simulation.

7. The system of claim 1, wherein the scanner is configured to execute the set of instructions from a start address until a return address.

8. The system of claim 1, wherein the scanner is configured to stop executing the simulation responsive to encountering the speculation denial instruction.

9. The system of claim 8, wherein the speculation denial instruction is one of a load fence (LFENCE), a barrier (CSDB), or a pause (pause).

10. The system of claim 1, wherein the first simulation is restricted to a region of the memory.

11. The system of claim 1, wherein the register is stored on the stack, and wherein the register is a CPU register.

12. A method comprising:
  executing, by a scanner, a first simulation of a set of instructions;
  tracking, by the scanner, at least one of a register value and a stack value while executing the first simulation of the set of instructions;
  responsive to encountering a conditional branch, splitting, by the scanner, the first simulation into a second simulation and a third simulation, wherein the second simulation and the third simulation follow respective legs of the conditional branch;
  tracking, by the scanner, a movement from at least one of a register and a stack;
  recording, by the scanner, the movement and an instruction of the set of instructions associated with the movement;
  reporting, by the scanner, a potential vulnerability;
  placing, by the scanner, a speculation denial instruction within the set of instructions at a respective conditional branch associated with the potential vulnerability;
  tracking, by the scanner, program data associated with at least one of the first simulation, the second simulation, and the third simulation;
  responsive to tracking program data, determining, by the scanner, the potential vulnerability is an actual security threat;
  placing, by the scanner the speculation denial instruction within the set of instructions at the respective conditional branch associated with the actual security threat; and
  abstaining from placing, by the scanner, the speculation denial instruction at a second respective conditional branch associated with a second potential vulnerability, wherein the second potential vulnerability is a reported false positive.

13. The method of claim 12, further comprising:
  responsive to encountering a successive conditional branch, splitting, by the scanner, the second simulation into a fourth simulation and a fifth simulation, and wherein the fourth simulation and the fifth simulation follow respective legs of the successive conditional branch.

14. The method of claim 13, further comprising:

responsive to one of a quantity of simulations reaching an upper limit or a quantity of the set of instructions reaching a threshold, stopping, by the scanner, each simulation.

15. A non-transitory machine-readable medium storing code, which when executed by a scanner, is configured to:

execute a first simulation of a set of instructions;

track at least one of a register value and a stack value while executing the first simulation of the set of instructions;

responsive to encountering a conditional branch, split the first simulation into a second simulation and a third simulation, wherein
 the second simulation and the third simulation follow respective legs of the conditional branch,
 a first quantity of the set of instructions in a respective simulation is limited to a first simulation threshold, and
 a second quantity of conditional branches is limited to a second simulation threshold;

track a movement from at least one of a register and a stack associated with a memory;

record the movement and an instruction of the set of instructions associated with the movement;

report a potential vulnerability; and place a speculation denial instruction within the set of instructions at a respective conditional branch associated with the potential vulnerability.

16. The non-transitory machine-readable medium of claim 15, wherein the potential vulnerability is a Spectre vulnerability.

17. The non-transitory machine-readable medium of claim 15, wherein the memory is cache memory.

18. The non-transitory machine-readable medium of claim 15, further configured to track program data associated with at least one of the first simulation, the second simulation, and the third simulation.

19. The non-transitory machine-readable medium of claim 15, further configured to split the second simulation into a fourth simulation and a fifth simulation responsive to encountering a successive conditional branch, and wherein the fourth simulation and the fifth simulation follow respective legs of the successive conditional branch.

20. The non-transitory machine-readable medium of claim 19, further configured to stop each simulation responsive to a quantity of simulations reaching an upper limit.

* * * * *